United States Patent [19]
Regulla

[11] 3,899,679
[45] Aug. 12, 1975

[54] MANGANESE ACTIVATED PHOSPHATE GLASS FOR DOSIMETRY

[75] Inventor: Dieter Regulla, Munich, Germany

[73] Assignee: Gesellschaft fur Strahlen-und Umweltforschung mbH, Munich, Germany

[22] Filed: Nov. 21, 1973

[21] Appl. No.: 417,754

[52] U.S. Cl. ............................................. 250/484
[51] Int. Cl. ........................................... G01t 1/11
[58] Field of Search .......... 250/484, 483, 472, 473, 250/337; 252/301.4 P

[56] References Cited
UNITED STATES PATENTS
3,294,700  12/1966  Bedier et al. ................. 250/484 X
3,769,510  10/1973  Kotera et al. .................. 250/484 X

*Primary Examiner*—Archie R. Borchelt
*Assistant Examiner*—Davis L. Willis
*Attorney, Agent, or Firm*—Spencer & Kaye

[57] ABSTRACT

A measuring element comprises a metaphosphate glass doped with manganese as an activator. The manganese activated metaphosphate glass can detect and determine radiation doses in the range between milliroentgens and more than 10 megaroentgens.

4 Claims, 8 Drawing Figures

MANGANESE ACTIVATED PHOSPHATE GLASS FOR DOSIMETRY

The present invention relates to a measuring element for detecting ionizing radiation and determining radiation doses in the range between milliroentgens and more than 10 megaroentgens by means of the radiation induced thermoluminescence effect.

Solid state dosimeters are used in medicine, biology, industry and research and are increasingly employed in personnel dose monitoring. This applies to radio-thermoluminescence dosimeters in particular which offer certain advantages in terms of dosimetry as against other solid state dosimeters.

In radioluminescence dosimetry technology radiation detector materials are known which function on the basis of ion crystals, e.g., lithium fluoride and calcium fluoride. In order to homogenize their radiation sensitivity, the crystals are usually pulverized and mixed; hence, there are radiation detectors made of loose or sintered crystal powders (compacts). However, the relatively complicated and hence costly method of production gives rise to difficulties, especially in practical dosimetry application, which are due to the differences, which sometimes are considerable, in radiation sensitivities of individual detectors and to the mean radiation sensitivity of a number of detectors sometimes varying from batch to batch. Moreover, variations in the distribution of the adhesion points and hence the radiation sensitivity are caused by the temperature treatment to which radiation detectors must be subjected in the measurung cycle. These "dynamics of the adhesion points" can greatly impair the measuring accuracy and thus the reliability of the dosimetry information obtained from detectors which are re-used.

Hence, it is the purpose of the present invention to create a radiation measuring element, a thermoluminescence dosimeter in particular, which is characterized by a simple and reproducible method of fabrication, high radiation sensitivity at effective atomic numbers as low as possible, by the absence of any "dynamics of adhesion points" and which can be re-used and exhibits a minimum variation in color up to maximum doses.

According to the present invention, the solution of this problem is characterized by a phosphate glass doped with activators for increased thermoluminescence yield and hence radiation sensitivity.

In an extension of the present invention, to the phosphate glass can be added an element of the manganese group in a concentration between 0.1 and in excess of 10%, and dysprosium.

In a different embodiment of the present invention the phosphate glass may additionally be doped with activators of the cerium, silver group to reduce discoloration at high doses. In this case, radio-thermoluminescence will increase in proportion with the amount of activator; accordingly, the radiation sensitivity can be controlled through the activator concentration and the photoluminescence of the activator ($\lambda$ emission $\approx$ 600 nm) under the action of ultraviolet radiation ($\lambda$ stimulation $\approx$ 420 nm).

One special advantage of the measuring element according to the present invention is the fact that it can be heated to temperatures in excess of 100°C to stimulate radiation emission in the wavelength range between 500 and 750 nm. This ensures excellent time constance of the dose information.

Another important factor is the use as a substance for making the measuring element of a material which so far has practically been disregarded in thermoluminescence dosimetry though it is easy to fabricate, i.e., glass in the form of metaphosphate glass of a low atomic number to which activator additives can be added to intensify the important effect used in dosimetry. Thus, for instance, manganese as an activator enhances the thermoluminescent radiation sensitivity, while silver decreases the thermoluminescent properties in large dose measurements by a specific degree and cerium reduces the disturbing discoloration of glass at high doses. In this way, detectors are made with high, easily controlled radiation sensitivity for the milliroentgen to megaroentgen dose range with a linear dose — effect relationship within a wide dose range. Moreover, radiation Sensitivity is comparatively independent of energy because of the basic materials. The substance of the measuring element exhibits no "dynamics of adhesion points" when heated. Hence, the elements can be re-used without having to be thermally regenerated and still maintain excellent reproducibility of radiation sensitivity. Moreover, homogeneous radiation sensitivity of all the measuring elements of a batch is ensured.

The present invention is explained in greater detail below by FIGS. 1 to 8 on the basis of several embodiments.

In a preferred embodiment of the present invention a metaphosphate glass of low atomic number Z is used as the basic material for the measuring element. It is doped with manganese to increase the thermoluminescence yield by a defined margin. The radiation sensitivity can easily be changed via the activator concentration.

Figure 1:
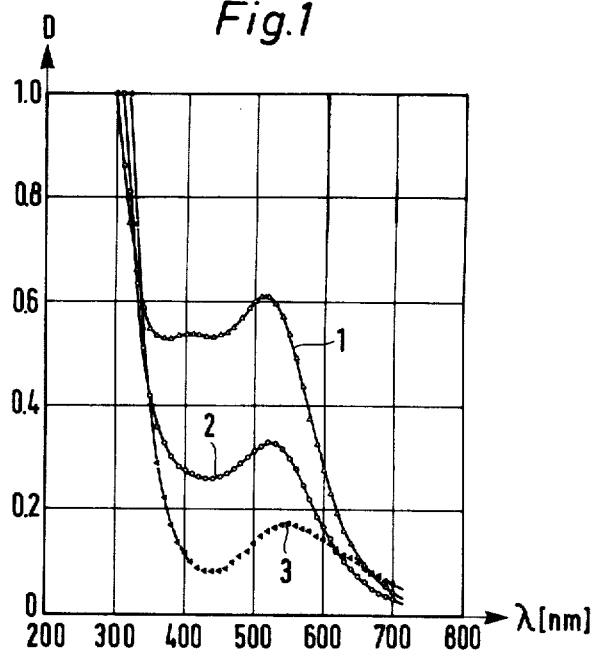
FIG. 1 is a graph showing the relationship between the optical density D and the wavelength $\lambda$ for three metaphosphate glasses doped with varying amounts of manganese.

In FIG. 1 the optical density D has been plotted over the wavelength λ expressed in nm for metaphosphate glass doped with 0.1, 0.3 and 1.0% of manganese (curves 1 – 3). As the manganese concentration is raised to one percent by weight, the disturbing absorption bands around 400 nm and 520 nm are reduced while only a weak absorption band occurs around 520 nm which is typical of the manganese activator. Manganese activation results in an increase in the radiothermoluminescence yield which is up to a factor of $10^4$ higher than that of silver doped phosphate glass while, at the same time, the disturbing discoloration of the glass is reduced. Moreover, the low atomic number Z of manganese (Z = 25) as against silver (Z = 47) results in less marked energy characteristics of the detector.

Figure 2:
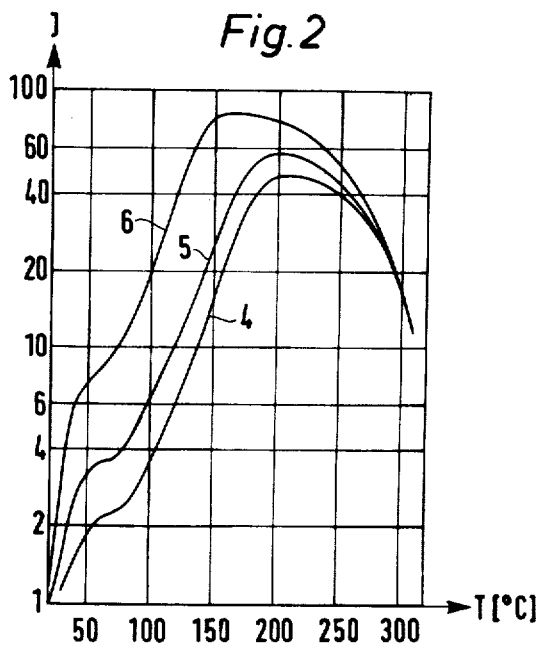
FIG. 2 is a graph showing the relationship between radio-thermoluminescence intensity J and read-out temperature T for three metaphosphate glasses doped with varying amounts of manganese.

The emission of intense radio-thermoluminescence of phosphate glasses doped with manganese observed after irradiation is stimulated by heating to more than 350°C. FIG. 2 (a plot of the radiothermoluminescence intensity J over the temperature T expressed in degrees centigrade) shows glow curves 4 to 6 which were obtained by a linear rate of heating of 0.5°C per second. The distribution of glow peaks is a function of manganese concentrations (0.1, 0.3, 1%, corresponding to glow curves 4 to 6). For low values of the manganese concentration a peak is obtained around 200°C which is due to the glass base. Superimposed upon this base peak there is another glow peak around 150°C and still another one below room temperature; both peaks are typical of the activator. The 150°C peak becomes dominant for manganese concentrations above 1 wt.%. The most important radio-thermoluminescence peaks occur at temperatures high enough to avoid fading even at elevated temperatures, if the detector is tempered at 80°C for 15 minutes before evaluation.

Figure 3:
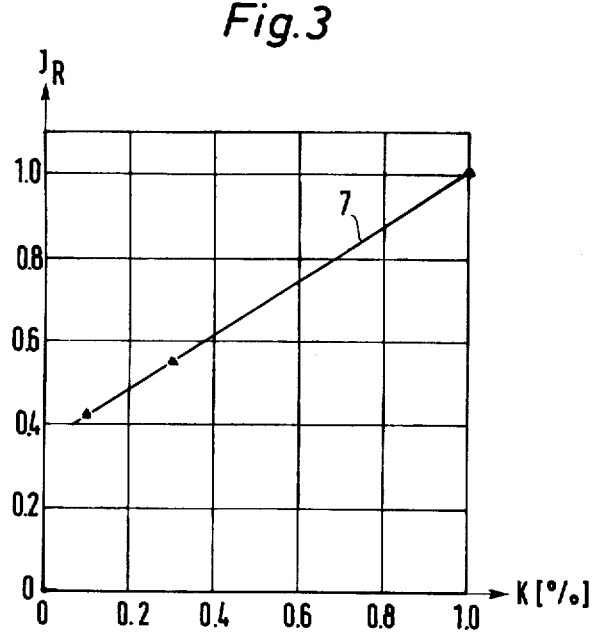
FIG. 3 is a graph showing the relationship of the relative luminescence intensity $J_R$ and manganese concentration K of manganese activated metaphosphate glass.

FIG. 3, which is a plot of the relative luminescence intensity $J_R$ over the manganese concentration K expressed in wt. %, shows that the radio-thermoluminescence yield increases linearly with the manganese concentration. This can be seen from curve 7.

Figure 4:
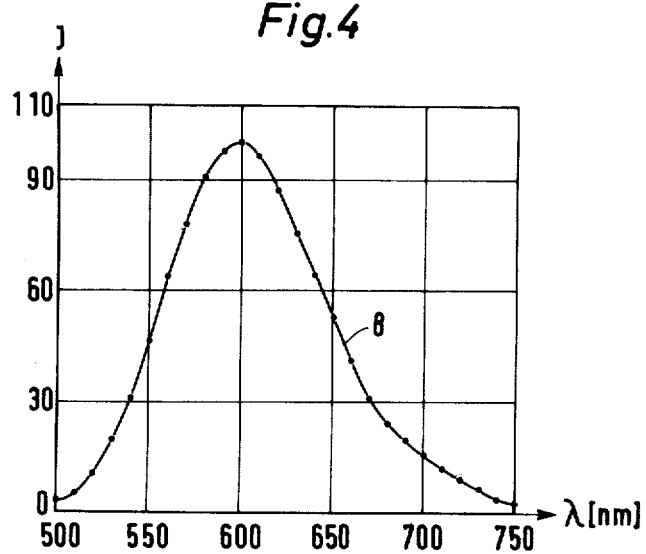
FIG. 4 is a graph showing the relationship between radio-thermoluminescence intensity J and wavelength $\lambda$.

From FIG. 4, in which the radio-thermoluminescence intensity J has been plotted over the wavelength λ expressed in nm, it is evident in curve 8 that the radio-thermoluminescence emission spectrum ranges between 500 nm and 750 nm with a peak around 600 nm. The spectrum was recorded repeatedly at temperatures between 100° and 200°C.

Figure 5:
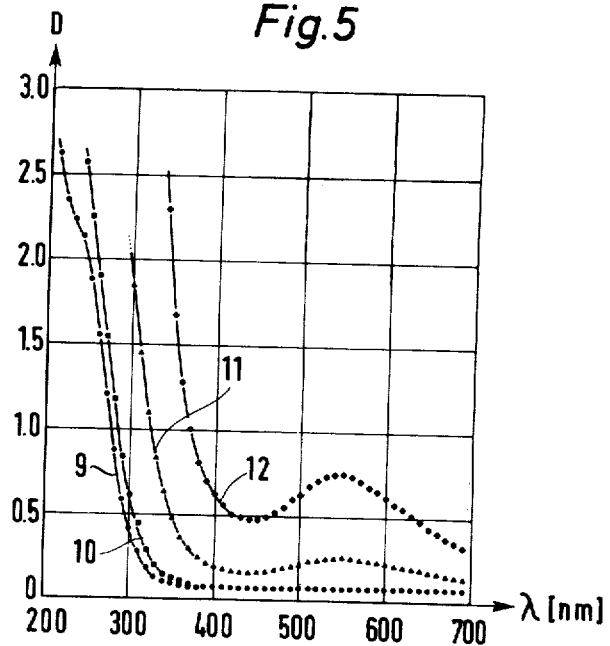
FIG. 5 is a graph showing the relationship between the optical density D and wavelength $\lambda$ of an unradiated manganese activated phosphate glass and of three irradiated manganese activated phosphate glasses.

FIG. 5, which is a plot of the optical density D of the glasses over the wavelength λ expressed in nm, shows the optical absorption spectra of unirradiated and irradiated samples at doses of $10^5$, $10^6$, and $10^7$ roentgens as curves 9 to 12. It can be seen that an absorption peak at around 550 nm referred to manganese is responsible for the violet color at maximun doses. However, it will create a disturbing superposition upon the thermoluminescence emission spectrum with its emission peak around 600 nm (FIG. 4) only at doses around 1 megaroentgen and above. Hence, the dose measurement range of phosphate glass doped with manganese extends well into the megaroentgen range and is essentially undisturbed by discoloration absorption.

Figure 6:
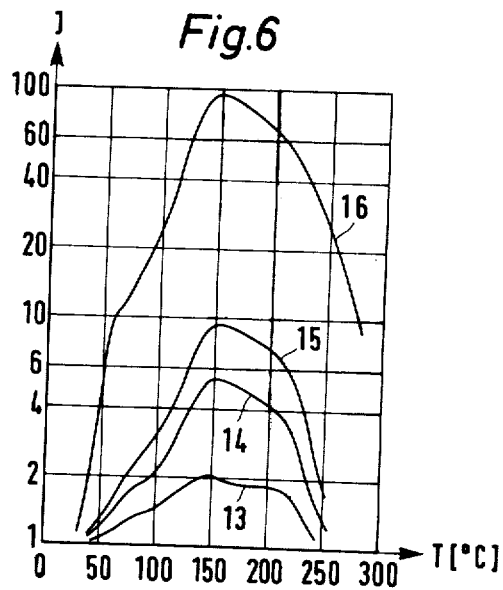
FIG. 6 is a graph showing the relationship between radio-thermoluminescence intensity J and read-out temperature T for a manganese activated metaphosphate glass at various exposure doses.

FIG. 6, in which the radio-thermoluminescence intensity J has been plotted over the temperature T expressed in degrees centigrade, shows glow curves 13 to 16 for various exposure doses (15, 50, 100 and 1000 milliroentgens) obtained with the same detector. In every case the glass was re-used without any previous regeneration process. Measurements show that manganese doped phosphate glass allows dose determinations down to the milliroentgen range.

Figure 7:
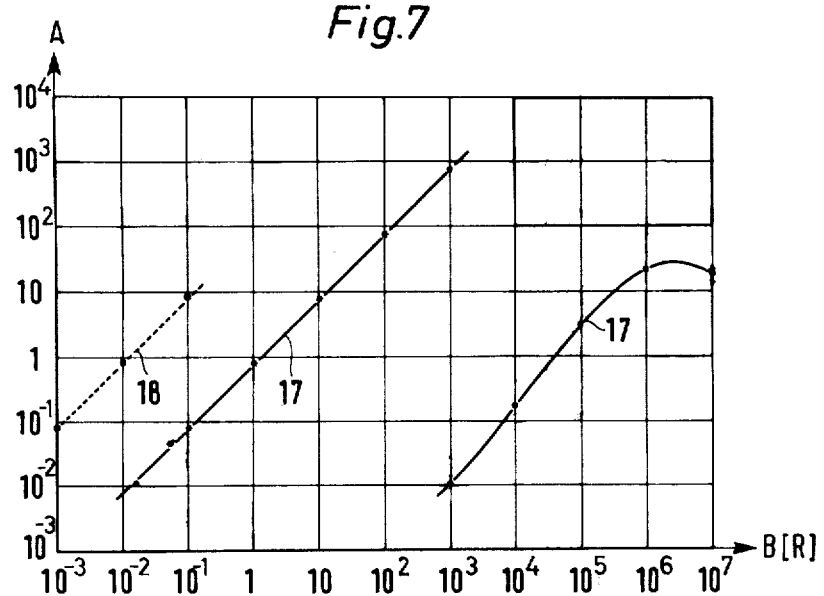
FIG. 7 is a graph showing the dose range that can be obtained with manganese activated metaphosphate glass.

The dose range that can be covered is shown in FIG. 7. The measurements were performed with glass plates 6 × 6 × 1.5 mm in size. Curves 17 and 18 show the reading of a commercial thermoluminescence evaluation unit as compared with the exposure dose B expressed in roentgens for two different sensitivity ranges of the evaluation unit. In addition, curve 17 shows that the integral radio-thermoluminescence yield of the measuring element is proportional the dose between 10 milliroentgens and a few kiloroentgens with normal sensitivities of the indication equipment. For higher doses a so-called superlinearity is found which turned out to be practically independent of the manganese concentration. The upper limit of applicability of the measuring element using the radio-thermoluminescence method is around one megaroentgen. It can be extended to 10 megaroentgen by measuring the decrease of photoluminescence that can be stimulated by UV emission; at even higher doses it is possible to perform absorption measurements. Another extension of the range of dose measurement by means of the radio-thermoluminescence method is possible by introducing suitable co-activators into the glass. The lowest limit of measurement is expected to be around 1 milliroentgen.

Figure 8:
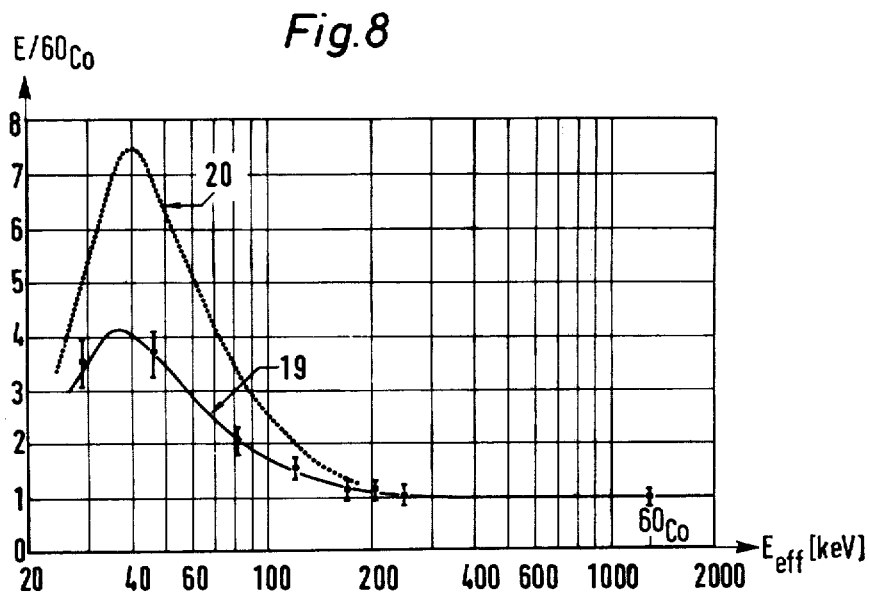
FIG. 8 is a graph showing the relationship between the radiation sensitivity E (standardized to Co-60) and the effective photo energy $E_{eff}$ for a 0.3 wt. % manganese activated phosphate glass and for a silver doped phosphate glass.

The experimental determination of the dependence on photon energy of the radiation sensitivity is shown in FIG. 8. This is a plot of the radiation sensitivity E (standardized to Co – 60) versus the effective photon energy $E_{eff}$ expressed in kiloelectron volts for a phosphate glass containing 0.3 wt.% of manganese (curve 19). For comparison, the corresponding curve of a silver doped phosphate glass (curve 20) is shown. The radiation sensitivity of the measuring element according to the present invention increases only up to a factor of 4 at about 35 kiloelectron volts as against a factor of 7.5 at 45 kiloelectron volts of silver doped phosphate glass.

What we claim is:

1. Measuring element for detecting ionizing radiation and determining radiation doses in the range from milliroentgen to more than 10 megaroentgens by radiation induced thermoluminescence, comprising a metaphosphate glass doped with manganese as an activator for increasing thermoluminescence yield.

2. Measuring element as claimed in claim 1, wherein the manganese is mixed with the metaphosphate glass in a concentration of from 0.1% to more than 1.0%.

3. Measuring element as claimed in claim 2, wherein the phosphate glass additionally contains activators of Ce and Ag.

4. Measuring element as claimed in claim 1, wherein the manganese concentration is from 0.1 to 1% for detecting and determining radiation doses in the range between $10^{-2}$ and $10^7$ roentgens.

* * * * *